United States Patent [19]

Corneau, Jr.

[11] Patent Number: 5,370,598
[45] Date of Patent: Dec. 6, 1994

[54] METHOD OF MAKING REUSABLE VACUUM BAG

[75] Inventor: Louis P. Corneau, Jr., Milledgeville, Ga.

[73] Assignee: Grumman Aerospace Corporation, Bethpage, N.Y.

[21] Appl. No.: 55,511

[22] Filed: Apr. 29, 1993

[51] Int. Cl.⁵ .................. B31B 21/72; B31B 21/26
[52] U.S. Cl. .................. 493/220; 493/189; 493/924
[58] Field of Search ............... 493/186, 189, 210, 214, 493/220, 924

[56] References Cited

U.S. PATENT DOCUMENTS

| 3,738,091 | 6/1973 | Fesco | 493/213 |
| 3,803,815 | 4/1974 | Anderson et al. | 493/213 |
| 3,845,695 | 11/1974 | Randazzo | 493/215 |
| 4,292,033 | 9/1981 | Wolske | 493/221 |
| 4,411,644 | 10/1983 | Tinklenberg | 493/213 |
| 4,512,788 | 4/1985 | Weinstein | 493/924 |
| 4,645,482 | 2/1987 | Yoshida | 493/189 |
| 4,648,860 | 3/1987 | Cassey | 493/195 |
| 4,704,101 | 11/1987 | Schirmer | 493/195 |
| 5,038,547 | 8/1991 | Kai et al. | 493/930 |

*Primary Examiner*—William E. Terrell
*Attorney, Agent, or Firm*—Collard & Roe

[57] ABSTRACT

A reusable silicone vacuum bag is manufactured by making a silicone vacuum bag envelope having peripheral edges. The bag envelope is spread so that the peripheral edges frame the envelope. FEP is bonded to an area bordering the peripheral edges. The bag envelope is folded over on itself at the peripheral edges. Edge sealing tape is applied to the FEP in the area bordering the peripheral edges and covering the peripheral edges with the tape.

3 Claims, 2 Drawing Sheets

METHOD OF MAKING REUSABLE VACUUM BAG

BACKGROUND OF THE INVENTION

1. Field of the Invention

The present invention relates to a reusable vacuum bag and a method of manufacturing same. More particularly, the invention relates to a reusable silicone vacuum bag and a method of manufacturing same.

2. The Prior Art

Nylon bagging material is expensive, and a nylon bag can only be used once in an autoclave or oven cure. The nylon bagging material is highly susceptible to bridging, which could result in autoclave failure. Autoclave silicone vacuum bags are manufactured with silicone extruded edge seals, which are very expensive. These edge seals are attached to the appropriate tool. Furthermore, most silicone bags are stiffened on their periphery by a frame, which is cumbersome and creates a storage problem.

The principal object of the invention is to provide silicone vacuum bags which may be reused.

It is therefore an object of the present invention to provide silicone vacuum bags which may be reused.

Another object of the present invention is to provide silicone vacuum bags which may be reused without causing autoclave failure.

Another object of the invention is to provide silicone vacuum bags by a method which is not very expensive.

Still another object of the invention is to provide silicone vacuum bags which are not cumbersome.

Yet another object of the invention is to provide silicone vacuum bags which nay be stored without difficulty.

Another object of the invention is to provide compaction of composite plies which is not expensive.

Still another object of the invention is to provide compaction of composite plies which is not cumbersome.

Yet another object of the invention is to provide compaction of silicone composite plies which may be stored without difficulty.

Another object of the invention is to provide a reusable silicone vacuum bag which is inexpensive in manufacture and efficient, effective and reliable in use and in storage.

Still another object of the invention is to provide a method of manufacturing a silicone vacuum bag, which method has few and simple steps and is undertaken with facility and convenience by anyone ordinarily skilled in the art.

Yet another object of the invention is to provide compacted composite plies and a method of compacting composite plies, which compacted plies and method of compacting are efficient, effective, reliable and inexpensive.

Another object of the invention is to provide a silicone vacuum bag which eliminates "bridging," which occurs with nylon bags when used with a mold.

BRIEF SUMMARY OF THE INVENTION

In accordance with the invention, a method of manufacturing a reusable vacuum bag comprises the steps of making a vacuum bag envelope having peripheral edges, spreading the bag envelope so that the peripheral edges frame the envelope, bonding resin to an area bordering the peripheral edges, folding the bag envelope over on itself at the peripheral edges, and applying edge sealing tape to the resin in the area bordering the peripheral edges and covering the peripheral edges with the tape. The vacuum bag envelope is a silicone vacuum bag envelope. The resin comprises a film of fluorinated ethylene propylene (FEP).

In accordance with the invention, a method of manufacturing a reusable silicone vacuum bag comprises the steps of making a silicone vacuum bag envelope having peripheral edges, spreading the bag envelope so that the peripheral edges frame the envelope, bonding bondable FEP to an area bordering the peripheral edges, folding the bag envelope over on itself at the peripheral edges, and applying edge sealing tape to the FEP in the area bordering the peripheral edges and covering the peripheral edges with the tape.

In accordance with the invention, a reusable vacuum bag comprises a vacuum bag envelope having peripheral edges. Resin and bondable FEP are bonded to an area bordering the peripheral edges and the envelope is folded over on itself at the peripheral edges. Edge sealing tape is applied to the FEP in the area bordering the peripheral edges and covers the peripheral edges. The vacuum bag envelope is a silicone vacuum bag envelope.

In accordance with the invention, a method of compacting composite plies comprises the steps of making a silicone vacuum bag envelope having peripheral edges, spreading the bag envelope so that the peripheral edges frame the envelope, bonding bondable FEP to an area bordering the peripheral edges, folding the bag envelope over on itself at the peripheral edges, applying edge sealing tape to the FEP in the area bordering the peripheral edge, covering the peripheral edges with the tape and placing and compacting the composite plies in the silicone vacuum bag.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
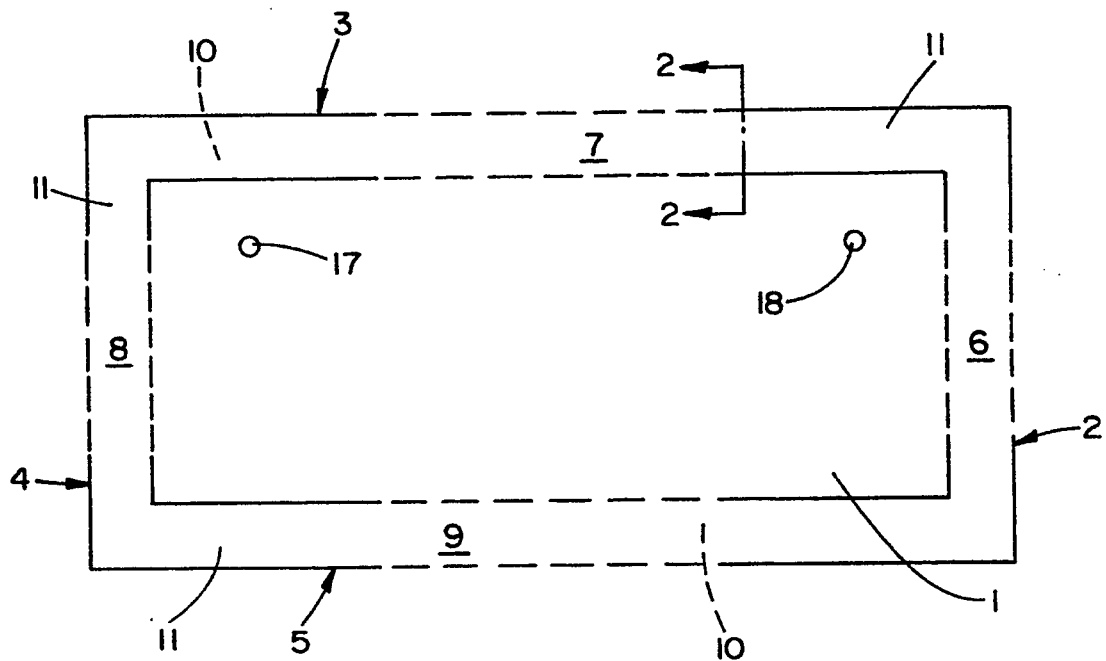
FIG. 1 is a top plan view of an embodiment of the reusable silicone vacuum bag of the invention.

Turning now in detail to the drawings, the reusable silicone vacuum bag of the invention comprises a silicone vacuum bag envelope 1 (FIGS. 1 to 3) having peripheral edges 2, 3, 4 and 5 (FIG. 1). In accordance with the invention, a bondable FEP is bonded to an area 6, 7, 8 and 9 (FIG. 1) which borders the peripheral edges 2, 3, 4 and 5, respectively (FIG. 1) of the silicone sheets 1A and 1B (FIGS. 2 and 3), which form the envelope 1.

The FEP 10 (FIGS. 1 to 3) is fluorinated ethylene propylene-copolymers of tetrafluoroethylene and hexafluoropropylene. The FEP is bondable. Edge sealing tape 11 of any suitable known type is applied between the two films or deposits of FEP 10A and 10B (FIGS.

2 and 3) in the area 6, 7, 8 and 9 bordering the peripheral edges 2, 3, 4 and 5, respectively, of the silicone sheets 1A and 1B, and covers said peripheral edges.

The method of the invention of manufacturing a reusable silicone vacuum bag comprises the steps of making the silicone vacuum bag envelope 1 (FIG. 1) having the peripheral edges 2, 3, 4 and 5 and spreading said bag envelope, as shown in FIG. 1, so that said peripheral edges frame or border said envelope.

Figure 2:
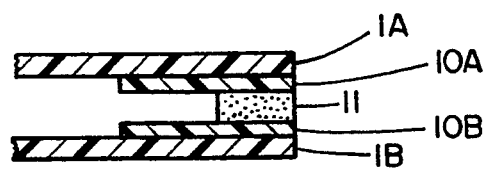
FIG. 2 is a cross-sectional view, on an enlarged scale, taken along the lines II—II of FIG. 1.
Figure 3:
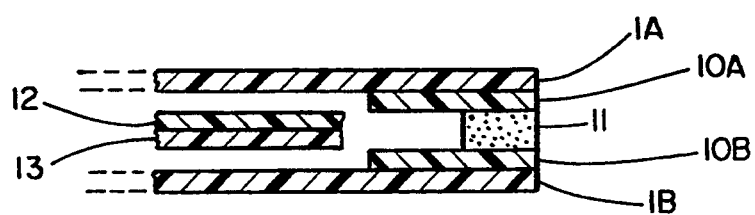
FIG. 3 is a cross-sectional view, on an enlarged scale, of an embodiment of the apparatus for completing the method of the invention for compacting composite plies.
Figure 4A:
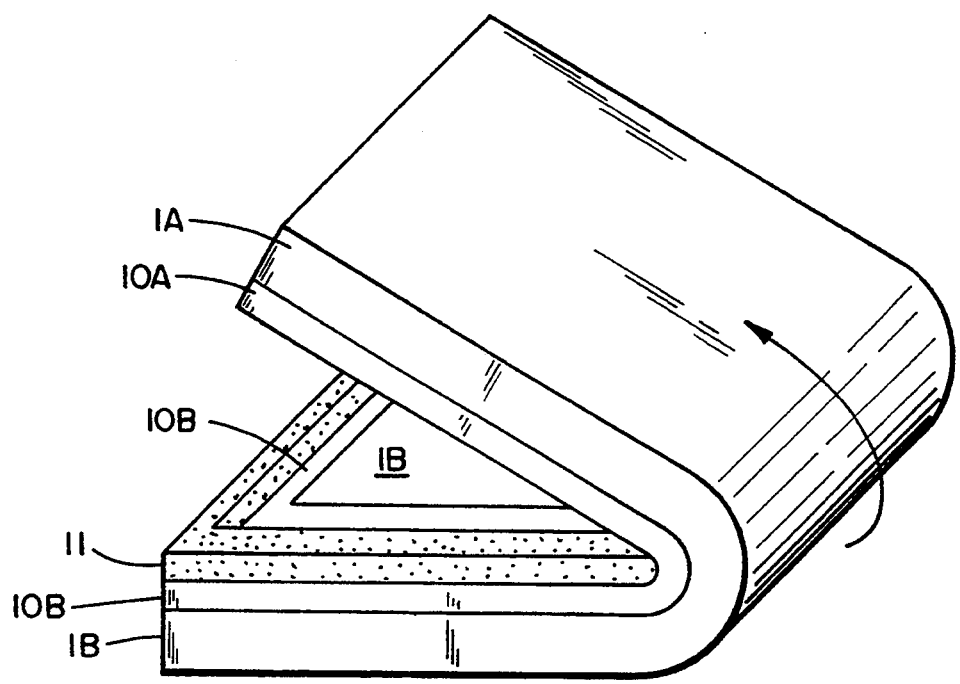
FIGS. 4A and 4B show the steps of folding and applying tape.
Figure 4B:
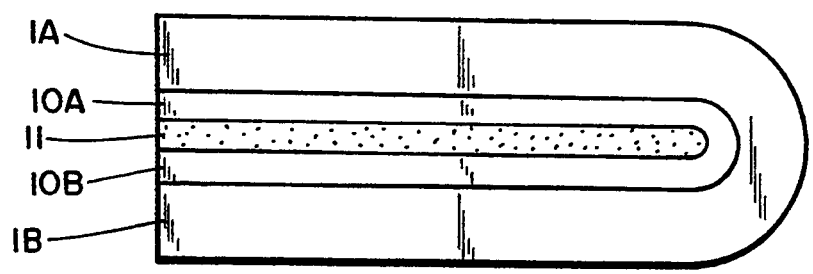

The next step of the method of the invention is to bond fluorinated ethylene propylene, or FEP 10, to an area bordering the peripheral edges 2, 3, 4 and 5, as shown in FIGS. 1 to 3. The bag envelope 1 is then folded over on itself, and, in accordance with the method of the invention, edge sealing tape 11 is applied between the two films of FEP 10A and 10B (FIGS. 2 and 3) in the area 6, 7, 8 and 9 bordering the peripheral edges 2, 3, 4 and 5, respectively, and covering said peripheral edges with said tape, as shown in FIGS. 2, 3, 4A and 4B.

The method of the invention of compacting composite plies comprises the steps of compacting composite plies such as, for example, plies 12 and 13 (FIG. 3) in the silicone vacuum bag of the invention, as shown in FIG. 3.

The silicone vacuum bag envelope 1 has vacuum ports 17 and 18 formed therein (FIG. 1). When a vacuum is produced in the silicone vacuum bag envelope 1, said bag is ready for insertion in an autoclave. The methods of the invention may be applied to a tool by bonding the FEP to the borders of the bag envelope with the sealing tape applied between the bag and the tool. The sealing tape is then easily removed from the tool or the bag. This would not be true if the sealing tape were applied to the tool without the FEP.

The method of the invention of compaction of composite plies is necessary in order to produce a reproducible component. Such method is faster and more efficient than methods which compact with nylon, PVC, or the like.

While different embodiments of the present invention have been shown and described, it is to be understood that many changes and modifications may be made thereunto without departing from the spirit and scope of the invention as defined in the appended claims.

What is claimed is:

1. A method of manufacturing a reusable vacuum bag, said method comprising the steps of:
   making a silicone vacuum bag envelope having peripheral edges;
   spreading said bag envelope so that said peripheral edges frame said envelope;
   bonding a film of fluorinated ethylene propylene resin to an area bordering said peripheral edges;
   folding said bag envelope over so that portions of said peripheral edges face each other; and
   applying edge sealing tape to said resin in said area bordering said peripheral edges to removably bond said facing peripheral edges together with said tape.

2. A method of manufacturing a reusable silicone vacuum bag, said method comprising the steps of:
   making a silicone vacuum bag envelope having peripheral edges;
   spreading said bag envelope so that said peripheral edges frame said envelope;
   bonding a film of bondable fluorinated copolymer to an area bordering said peripheral edges;
   folding said bag envelope over so that portions of said peripheral edges face each other; and
   applying edge sealing tape to said fluorinated copolymer in said area bordering said peripheral edges to removably bond said peripheral edges together with said tape.

3. A method of compacting composite plies, said method comprising the steps of:
   making a silicone vacuum bag envelope having peripheral edges;
   spreading said bag envelope so that said peripheral edges frame said envelope;
   bonding a film of bondable fluorinated copolymer to an area bordering said peripheral edges;
   folding said bag envelope over so that portions of said peripheral edges face each other;
   applying edge sealing tape to said fluorinated copolymer in said area bordering said peripheral edges to removably bond said facing peripheral edges together with said tape; and
   placing and compacting said composite plies in the silicone vacuum bag.

* * * * *